Oct. 10, 1950      B. S. THOMAS      2,524,858
INJECTION MOLD FOR PLASTIC MATERIALS
Filed Nov. 3, 1948      3 Sheets-Sheet 1

Inventor
B. S. Thomas
By M. C. Hayes
Attorney

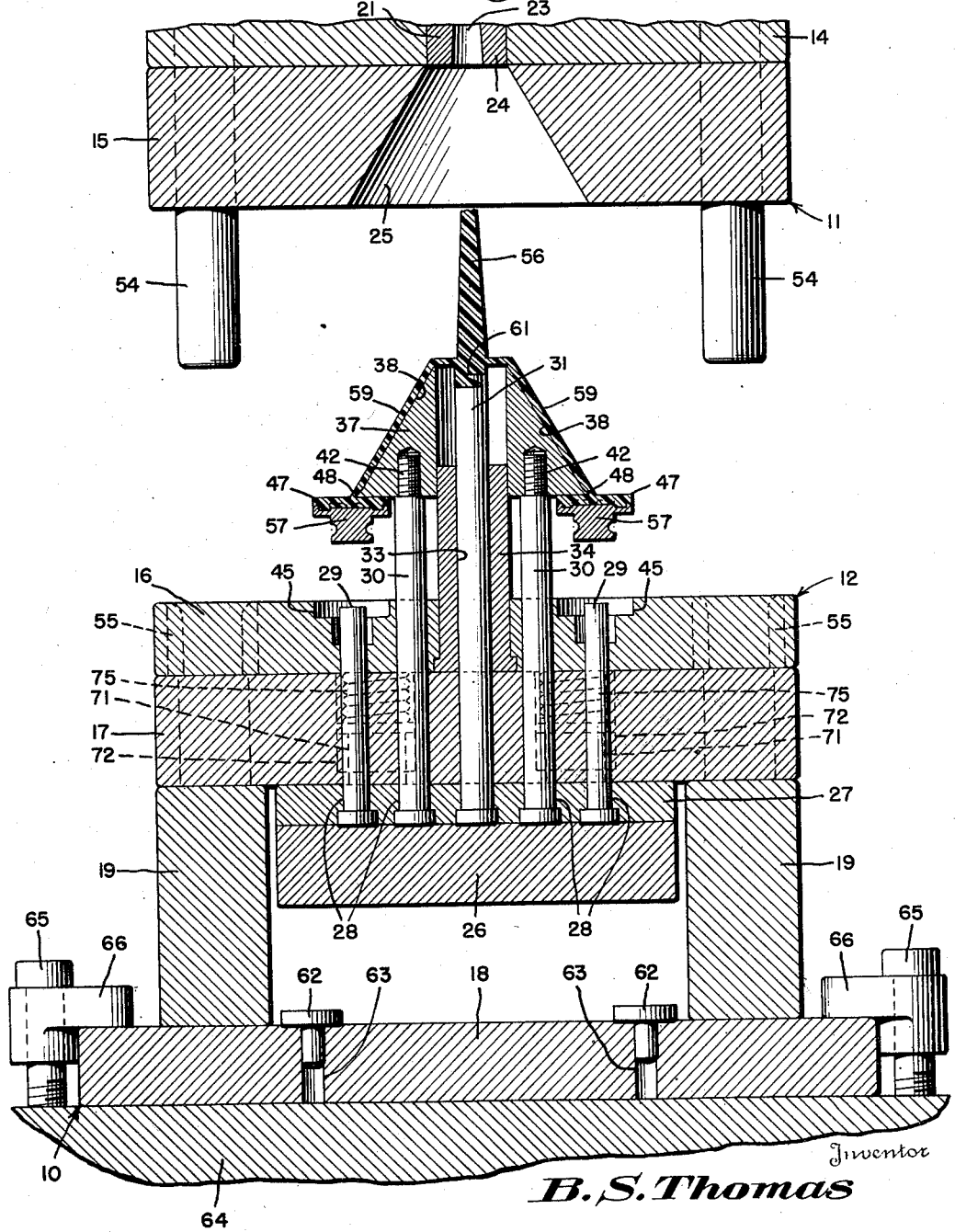

Oct. 10, 1950 B. S. THOMAS 2,524,858
INJECTION MOLD FOR PLASTIC MATERIALS
Filed Nov. 3, 1948 3 Sheets-Sheet 3
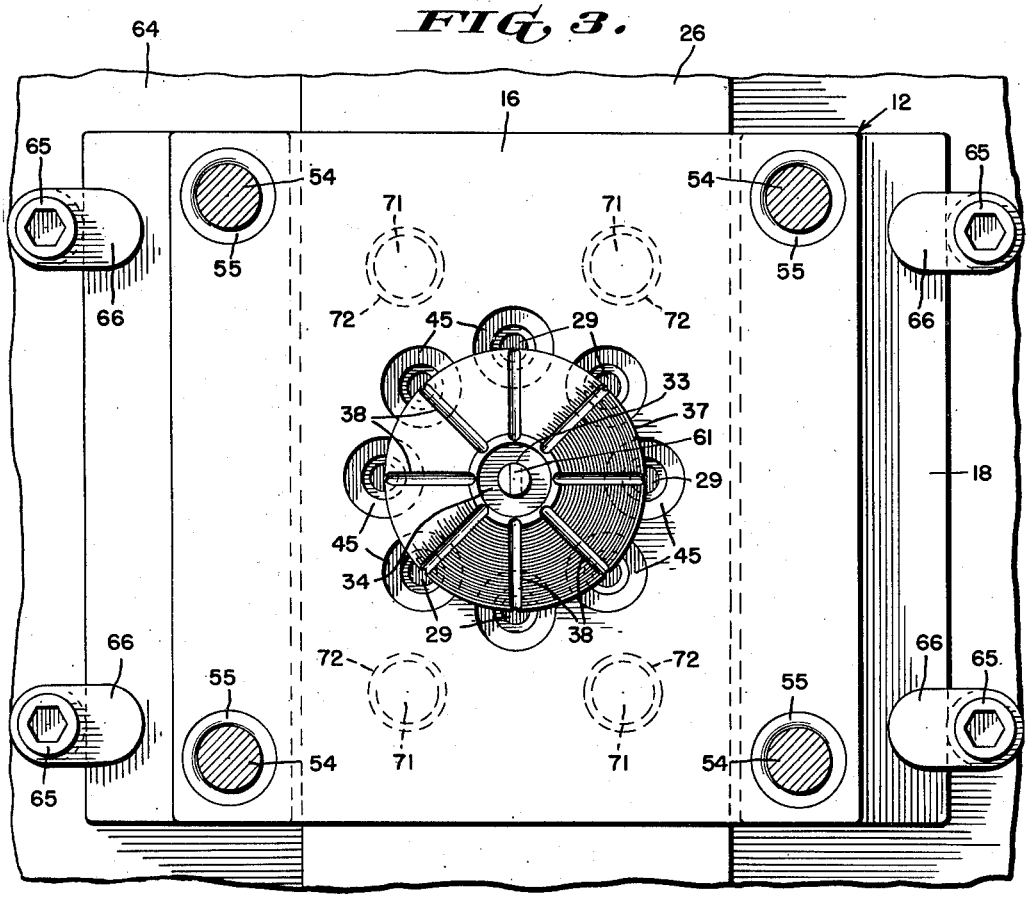
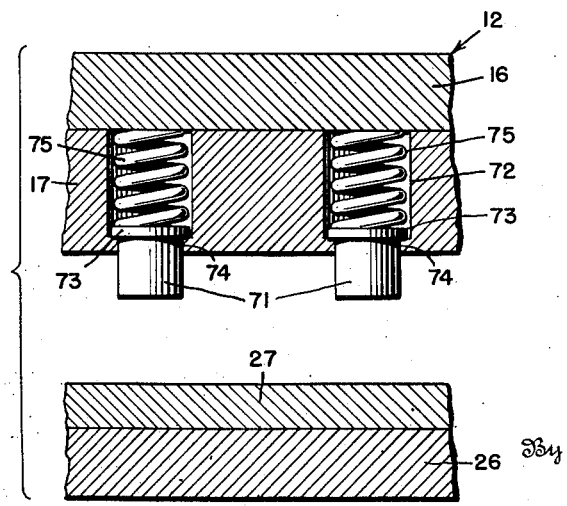
Inventor
*B. S. Thomas*
By *M. O. Hayes*
Attorney Patented Oct. 10, 1950

2,524,858

UNITED STATES PATENT OFFICE 2,524,858

INJECTION MOLD FOR PLASTIC MATERIALS

Bernard S. Thomas, Washington, D. C.

Application November 3, 1948, Serial No. 58,121

6 Claims. (Cl. 18—42)

(Granted under the act of March 3, 1883, as amended April 30, 1928; 370 O. G. 757)

The present invention relates to injection molding of plastic material. More particularly the invention relates to apparatus for molding plastic materials by the center gating method wherein a grooved cone-shaped member interfitted in a conical bore in the mold is provided to disperse the plastic material to the center of each of a plurality of individual molding cavities formed within the mold.

It has heretofore been the practice in the multiple molding of plastic materials to use either an arrangement of the so-called "hot runner" type mold or an arrangement using a free plate having a secondary sprue between the runners and cavities.

In the "hot runner" arrangement for the molding of plastics the temperature of the runner bores must be closely controlled in order to ensure the free flow of the plastic material therethrough. It is not an unusual condition, when using this method, for the runner bores to become clogged, by reason of temperature variations of the mold or other causes. Such clogging usually necessitates the removal of the mold from the molding machine in order to clear the runner bores, thus necessitating a considerable delay in the operation of the mold.

In the method using a free plate, the molded pieces must be manually severed from the secondary sprue before the primary sprue and runners can be removed from the mold, it being necessary frequently to remove the free plate to accomplish the foregoing operation. It has also been found particularly difficult, where inserts are used, to place the inserts in the cavities while the free plate is in position in the mold.

The apparatus of the present invention obviates the foregoing difficulties in mold operations by providing interfitting male and female frustum-shaped runner guide members individual to complementary mold sections, the male member having runner grooves formed on the conical surface thereof thereby to form the runner guides when the frustum-shaped members are in mutually interfitting relation in the assembled mold. When the present arrangement is used, the sprue, runners and the molded pieces may conveniently and integrally be removed from the mold in a single operation, it being necessary only to grasp the sprue after the complementary guide members have been separated upon separation of the complementary mold sections.

An important object of the present invention is to provide a new and improved mold for center gating of plastic materials in which imperfections are reduced to a great extent in the finished molded pieces produced therein.

Another object of the invention is to provide a mold for center gating of plastic materials in which the finished molded pieces are easily removed as a unit with the sprue and runners.

Still another object is to provide a mold for center grating of plastic materials in which the difficulties incurred by adhesion of the runners to the dispersing or runner grooves or bores is obviated.

A further object is to provide a new and improved mold for center gating of plastic materials which is particularly adapted for use with inserts.

A still further object is to provide a mold for center gating of plastic materials in which cleaning of the dispersing grooves is obviated and, therefore, a greater productive capacity is attained.

Another object is to provide a new and improved mold for center gating of plastic materials wherein the plastic material is dispersed from the collecting well to the molding cavities in an efficient manner and without requiring "hot runners."

An additional object resides in the provision of a mold for center gating of plastic materials and comprised of separable members which may be withdrawn from the charged mold thereby to free the sprue, runners and molded devices for removal therefrom as a unit.

A further object is to provide a new and improved mold for center gating of plastic material which is strong, durable and economical to manufacture.

Other objects and many of the attendant advantages of this invention will be readily appreciated as the same becomes better understood by reference to the following detailed description when considered in connection with the accompanying drawings wherein:

Fig. 2 is a view similar to that of Fig. 1, the components being in the open or ejecting position;

Fig. 3 is a vertical sectional view taken between the stationary and the movable members and illustrating the movable member and associated parts; and Fig. 4 is a horizontal detail sectional view illustrating the spring-urged pins employed to clear the insert cavities.

Figure 1:
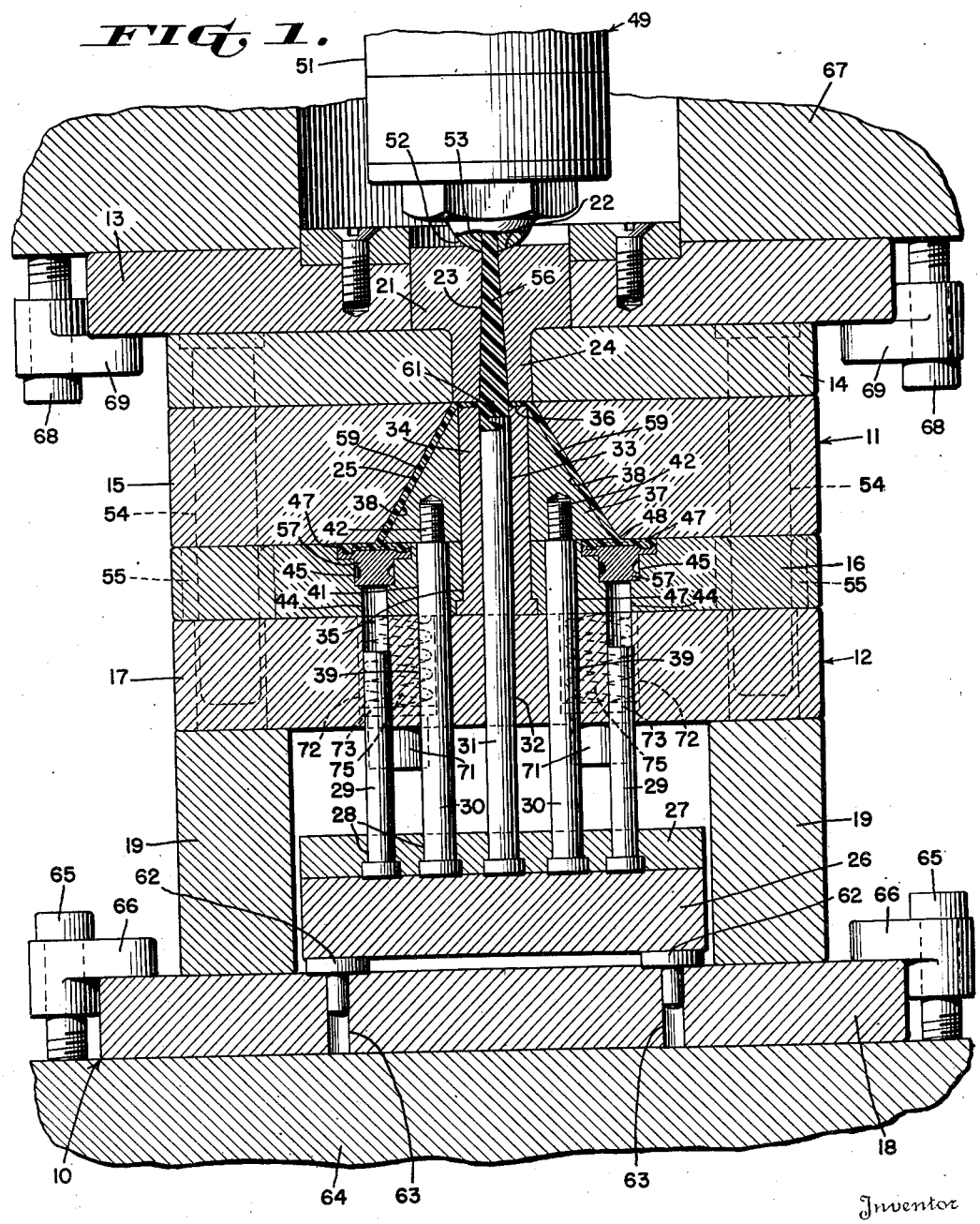
Fig. 1 is a horizontal sectional view of a mold for center gating of plastic materials in accordance with the preferred embodiment of the present invention, the components thereof being in the molding position.

Referring more particularly to the drawings, in which like numerals of reference indicate like parts throughout the several views, the numeral 10 indicates generally a molding apparatus having a stationary portion 11 and a movable ejection portion 12. The stationary portion 11 consists of plates 13, 14 and 15. The ejector portion 12 consists of plates 16, 17 and 18 and spacers 19.

A sprue bushing 21 having a concave depression 22 at the upper end thereof and a tapered central bore 23 therethrough is centrally mounted in plate 13 and has a reduced extension 24 extending through plate 14. The plate 15 has formed therein a frustum-shaped bore 25 in axial alignment with bore 23 of bushing 21.

A knockout bar 26 is mounted in a space between plates 17 and 18 provided by spacers 19 and has a pin clamping plate 27 secured to the upper face thereof as by any well known means, not shown. Clamping plate 27 has formed therein a plurality of graduated step bores 28 to receive a plurality of headed pins 29, 30 and 31.

Pin 31 passes through a central bore 32 in plate 17 and extends into a bore 33 of a flanged bushing 34. The flanged end of bushing 34 is mounted in graduated step bore 35 of plate 16 and extends in a direction toward plate 14, ending a short distance therefrom to define a dispersion well 36. Slidably arranged about bushing 34 is a male frustrum-shaped member 37 having a plurality of grooves 38 formed in the conical face thereof. The upper ends of the grooves communicate with the dispersion well 36.

The male frustum-shaped member 37 is nested snugly in frustum-shaped bore 25, as indicated in Fig. 1, during the molding operation. The plurality of headed pins 30 extends from knockout bar 26, through clamping plate 27, through bores 39 and 41 in plates 17 and 16, respectively, and are threadedly engaged with male frustum-shaped member 37 as at 42.

Each of the plurality of headed knockout pins 29 extends from knockout bar 26, through clamping plate 27, and is adapted to be moved through bores 43 and 44 in plates 17 and 16, respectively. A plurality of graduated-step molding cavities 45 is formed in plate 16, each cavity being in communication with one of the bores 44. The centers of cavities 45 are in alignment with the lower ends of grooves 38, each of the grooves having a restricted gate 48 at the lower end thereof. While in the present instance inserts 46 are provided for use in molding finished pieces 47, the molding cavities may be of such shape as to form finished pieces of any desired form with or without the use of inserts.

In order to supply plastic material to the bore 23 an injection mechanism of any well known type indicated generally at 49 is provided. The injector cylinder is indicated at 51 and is provided with a nozzle 52 which rests in the depression 22 and has a bore 53 in communication with bore 23.

Centering pins 54 are fixedly mounted in the injector portion 12 of the molding apparatus and extend through bushings 55 in member 16 of the stationary portion 11 during the molding operation for the purpose of maintaining the portions 11 and 12 and associated parts in alignment.

Stop pins 62 are positioned in bores 63 of plate 18 and act as stop means for knockout bar 26 when the bar is brought to the molding position prior to injecting the plastic material.

The movable portion 12 is clamped to the movable platen 64 of the molding machine by means of clamping screws 65 and ears 66, while stationary portion 11 is clamped to the fixed platen 67 of the molding machine by clamping screws 68 and ears 69.

It is also understood that knockout bar 26 is operatively connected to the molding machine in any well known manner sufficient to perform its function which is also well known to those skilled in the art to which the molding machine disclosed herein most closely appertains.

Each of a plurality of pins 71 is positioned in a bore 72 formed therefor in plate 17, one end of each of the pins normally contacting plate 27 while the mold is in the ejecting position of Fig. 2. The pins have heads 73 which contact the reductions 74 in bores 72 to limit the movement of the pins. Positioned between the heads of pins 71 and plate 16 in bores 72 are coil springs 75. The purpose of the aforementioned arrangement of pins 71 is to move the plate 27 and knockout bar 26 away from plate 17 independently of the movement of portion 12 thereby to move pins 29 out of the molding cavities 45 and thus clear the cavities for insertion of inserts at the start of each molding operation, it being understood that portion 12 is moved in accordance with conventional molding practice as a part of any suitable molding machine well known to the art and forming no part of the present invention.

The molding operation of the apparatus of the present invention may best be understood with particular reference to Fig. 1 wherein the condition of the mold is illustrated after the heated plastic material has been forced through nozzle 52 by the injector mechanism 49 into bore 23 of sprue bushing 21, thence to dispersion well 36 and through runner grooves 38, through gates 48 to molding cavities 45.

When the plastic material has set, portions 11 and 12 are separated as indicated in Fig. 2. As portion 12 moves away from portion 11, plate 17 first moves to bring pins 71 into engagement with plate 27, frustum-shaped member 37 and inserts 57 retaining their initial positions by reason of being bonded to the molded material. Upon further movement of portion 12, plate 27 and knock-out bar 26 are moved by pins 71 and these members, in turn, operate through pins 30 and 31 to pull the sprue 56, runners 59, molded pieces 47, core member 37, and inserts 57 from stationary portion 11, bushing 34 having been slideably moved within cone member 37 and plate 16 having been moved from the inserts upon initial movement of portion 12. Pin 31 is provided with a sprue locking finger 61 to form an interlocking connection with the sprue.

When knockout bar 26 reaches the position indicated in Fig. 2, pins 71 move into plate 17 upon further movement of portion 12, thereby to compress springs 75. Simultaneously therewith, pins 29 are forced through their respective bores in members 16 and 17 to forcibly eject any insert and molded material from the insert cavities which has not been removed in the manner set forth in the foregoing.

The molded pieces 47 with runners 59 and sprue 56 are removed as a unit by disengaging the sprue from the locking finger 61 and the runners from cone member 37 upon sufficient flexing of the molded material to free the same from these parts, it being appreciated that with a large portion of the molded material thus exposed, flexing of the material is readily accomplished to effect the unitary removal of the integral molded mass.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without payment of any royalties thereon or therefor.

What is claimed as new and desired to be secured by Letters Patent is:

1. Apparatus for molding plastic materials comprising, in combination, a stationary member having a frustum-shaped bore therein, said member having sprue forming means for receiving a quantity of plastic material under pressure into said bore, a frustum-shaped member having longitudinal runner grooves in the conical face thereof, said frustum-shaped member having interfitting engagement with the conical wall of said frustum-shaped bore whereby the plastic material therein is constrained to flow along said grooves, a movable member for moving said frustum-shaped member into interfitting relation with respect to said frustum-shaped bore, said movable member having a plurality of molding cavities therein for receiving the plastic material from the runner grooves whereby molded pieces are formed within the cavities, said molded pieces being retained adjacent the stationary member as the movable member is withdrawn, and means operatively connected to the sprue and rendered effective when the movable member has been withdrawn a predetermined extent for withdrawing the molded pieces as a unit with the runners and sprue from the stationary member.

2. Injection molding apparatus, comprising a fixed molding plate having a frustum-shaped bore and having associated therewith sprue forming means for injecting a quantity of heated plastic material into said bore, a movable molding plate movable into face adjacency with said fixed molding plate and having a plurality of molding cavities therein, a frustum-shaped member operatively connected to said movable plate and movable into interfitting relation with respect to the conical wall of said frustum-shaped bore as the movable plate moves into face adjacency with the fixed molding plate, said frustum-shaped member having a plurality of longitudinal grooves on the conical surface thereof for guiding the plastic material through said bore and into said molding cavities whereby finished plastic pieces are produced upon cooling and hardening of the plastic material, a knockout bar operatively connected to the sprue and to the frustum-shaped member and effectively connected to the movable plate for movement therewith following a predetermined movement of the movable plate, and means including said knockout bar for first withdrawing the hardened pieces from the molding cavities during said predetermined movement of the movable plate and subsequently thereto withdrawing the frustum-shaped member from the frustum-shaped bore during movement of the knockout bar whereby the finished plastic pieces together with the hardened material in the grooves may be removed as a unit from said molding plates.

3. An injection mold for plastic materials comprising, in combination, a stationary member having aligned axial and conical bores therein, a sprue bushing mounted in said axial bore in the stationary member and having a tapered bore therethrough for receiving a plastic molding material under pressure from an injection cylinder, said tapered bore communicating with said conical bore, a movable member having an open and a closed position, said movable member having a conical member mounted thereon and fitting snugly within said conical bore when the movable member is in the closed position thereof and cooperatively forming with said bushing a dispersion well for the material at the reduced end of the conical bore, said conical member having a central bore and a plurality of longitudinal grooves in the conical surface thereof and communicating with said dispersion well, said movable member having a plurality of molding cavities therein communicating with said longitudinal grooves when the movable member is in the closed position thereof, the pieces molded in said cavities being retained in the molded position thereof by the runners formed in said grooves as the movable member moves away from said closed position thereof, a knockout bar mounted for movement with respect to said movable and stationary members and movable by the movable member from a first to a second position after the movable member reaches an intermediate position during movement from said closed to said open positions thereof, said knockout bar having a plurality of pins secured thereto, a first group of said plurality of pins being secured to said conical member for moving the same from the conical bore upon movement of the knockout bar as the movable member moves from the intermediate positions to the open position, one of said plurality of pins being disposed within said central bore and having a locking finger extended into said dispersion well, said locking finger having interfitting engagement with the sprue formed in the sprue bushing whereby the sprue is severed from the injection cylinder and withdrawn from the bushing as the knockout bar moves, a second group of said plurality of pins being respectively in axial alignment with said molding cavities, and means effective as the movable member moves with respect to the knockout bar after the latter has moved to the second position thereof for moving said second group of pins into said cavities thereby to forcibly eject any molded material remaining therein.

4. An injection mold for plastic materials comprising, in combination, a frustum-shaped member having a plurality of longitudinal grooves in the conical surface thereof, a fixed member having a frustum-shaped bore for receiving said frustum-shaped member thereinto interfittingly therewith whereby plastic material forced into said bore is caused to flow through said grooves, a movable member having a plurality of molding cavities formed therein and communicating with said grooves respectively when the movable member is moved into face adjacency with said fixed member, and a lost motion connection between said movable member and said frustum-shaped member whereby the pieces molded in said cavities are retained in their molded positions by runners formed integrally therewith in said grooves upon initial movement of the movable member away from the fixed member and the frustum-shaped member together with the molded pieces and runners are withdrawn from the fixed member upon further movement of the movable member after said lost motion connection has become effective.

5. An injection mold for molding plastic materials comprising, in combination, a fixed member having a conical bore centrally disposed therein, said conical bore receiving plastic molding material under pressure from an injection cylinder, a movable member movable between an open and a closed position and having supported thereon a conical member having a plurality of runner grooves in the conical face thereof and snugly fitting within the conical bore of said fixed member when the movable member is in the closed position, a plurality of molding cavities in said movable member having the centers thereof in communication with said runner grooves when the movable member is in said closed position, the material molded in said cavities being retained in the molding positions thereof by the runners formed integrally therewith in said grooves upon movement of the movable member away from said closed position thereof, pin means comprising a lost motion connection between said conical member and said movable member for withdrawing the conical member from said conical bore thereby to withdraw the molded material and the runners simultaneously therewith from said fixed member as the movable member is moved to the open position whereby the molded material and runners may be removed from the mold as a unit.

6. Apparatus for the injection molding of plastic materials comprising, in combination, an injection mechanism having a nozzle provided with an orifice at one end thereof and having means for forcing the plastic molding material through said orifice, a fixed member having a sprue bushing provided with a bore in axial alignment with said orifice and for receiving the material as it is forced through said orifice, said fixed member having a conical bore in axial alignment with said sprue bushing bore for receiving the material from the sprue bushing bore, a movable member, a conical member operatively connected to said movable member for limited movement with respect thereto and movable into registering engagement within said conical bore when the movable member is moved into face adjacency with said fixed member, said conical member and bore defining a dispersion well for the material at the reduced extremity of the conical bore, said conical member having a plurality of runner grooves in the conical face thereof for receiving the material from the dispersion well, said runner grooves having reduced gates at the lower ends thereof, said movable member having a plurality of molding cavities in axial alignment with said gates for receiving the material as it passes therefrom when the fixed and movable members are in face adjacency, a movable knockout bar connected to said movable member for limited movement thereby, a plurality of pins attached to said movable knockout bar and arranged for unitary movement therewith upon movement thereof, a first group of said pins for forcing any plastic material remaining in the molding cavities upon further movement of the movable member after said limited movement of said knockout bar, a second group of said pins secured to said conical member and to the knockout bar for movement therewith thereby to move the same with the runners and molded pieces of the set material from said fixed member upon movement of the knockout bar by the movable member, said movable member upon initial movement thereof away from the fixed member being withdrawn from the molded pieces, and a single pin of said plurality of pins having a locking finger extending into said dispersion well thereby to be molded in interlocking relation with the sprue whereby the sprue, runners and the cavity molded material are removed as a unit from the fixed member upon said further movement of the movable member.

BERNARD S. THOMAS.

REFERENCES CITED

The following references are of record in the file of this patent:

UNITED STATES PATENTS

| Number | Name | Date |
| --- | --- | --- |
| 1,837,452 | Le May | Dec. 22, 1931 |
| 1,997,074 | Novotny | Apr. 9, 1935 |
| 2,217,661 | Anderson | Oct. 15, 1940 |
| 2,445,405 | Norris | July 20, 1948 |
| 2,457,336 | Wilson | Dec. 28, 1948 |